United States Patent [19]

James et al.

[11] Patent Number: 5,481,142
[45] Date of Patent: Jan. 2, 1996

[54] TUNED VIBRATION ABSORBERS FOR AC MOTORS

[75] Inventors: Courtney D. James, Decatur, Ga.; William J. Nowak, Webster; David K. Shogren, Ontario, both of N.Y.

[73] Assignee: Xerox Corporation, Stamford, Conn.

[21] Appl. No.: 269,502

[22] Filed: Jul. 1, 1994

[51] Int. Cl.$^6$ .......................... H02K 37/22; F16F 7/104; F16F 15/10
[52] U.S. Cl. ........................................................ 310/51
[58] Field of Search ................................................ 310/51

[56] References Cited

U.S. PATENT DOCUMENTS

| | | | |
|---|---|---|---|
| 3,317,166 | 5/1967 | Janssen | 310/51 |
| 3,545,301 | 12/1970 | Richter | 74/574 |
| 3,678,764 | 7/1972 | Erdley et al. | 74/5 |
| 4,082,005 | 4/1978 | Erdley | 73/505 |
| 4,126,046 | 11/1978 | Erdley | 73/504 |
| 4,309,107 | 1/1982 | McNair et al. | 356/350 |
| 4,471,248 | 9/1984 | Smetana | 310/51 |
| 4,596,158 | 6/1986 | Strugach | 74/5 F |
| 4,617,484 | 10/1986 | Buijsen | 310/51 |
| 4,724,923 | 2/1988 | Waterman | 181/208 |
| 4,736,701 | 4/1988 | Kondo | 114/340 |
| 4,935,651 | 6/1990 | Hong et al. | 310/51 |
| 5,124,601 | 6/1992 | Miyashita | 310/51 |
| 5,274,290 | 12/1993 | Fischer | 310/51 |
| 5,299,468 | 4/1994 | Withers | 74/574 |
| 5,402,024 | 3/1995 | Watanabe et al. | 310/51 |

FOREIGN PATENT DOCUMENTS

| | | | |
|---|---|---|---|
| 0283234 | 9/1988 | European Pat. Off. | 310/51 |
| 0078344 | 6/1981 | Japan | 310/51 |
| 6038419 | 2/1994 | Japan | 310/51 |

OTHER PUBLICATIONS

J. P. Den Hartog, *Mechanical Vibrations*, McGraw–Hill, 4th edition, 1956, pp. 86–93.

*Primary Examiner*—Thomas M. Dougherty
*Attorney, Agent, or Firm*—Oliff & Berridge

[57] ABSTRACT

A tuned vibration absorber is mounted on a motor armature of an AC synchronous motor. The tuned vibration absorber provides an anti-resonance which significantly attenuates the 120 Hz angular velocity pertibation of the AC motor. The tuned vibration absorber has a hub, which attaches to the armature of the AC motor. An inertia ring is connected to the hub via spokes. The spokes and inertia ring provide a torsional resonance to the motor, which attenuates the angular velocity error generated by the AC motor. Due to the reduction in 120 Hz velocity error, the motor can be used in digital printing apparatus with strict motion quality requirements.

16 Claims, 13 Drawing Sheets

| CRITICAL PARAMETER W/ NOMINALS | TRIAL 0 PREFERRED TOLERANCE | TRIAL 1 | TRIAL 2 | TRIAL 3 | TRIAL 4 | TRIAL 5 | TRIAL 6 |
|---|---|---|---|---|---|---|---|
| E 5240N/mm$^2$ | ± 520 | 260 (-50%) | 520 | 520 | 520 | 520 | 260 (-50%) |
| P 2.4E-9Mg/mm$^3$ | ± .048E-9 | .048E-9 | .024E-9 (-50%) | .048E-9 | .048E-9 | .048E-9 | .024E-9 (-50%) |
| $t_i$ 2.569mm | ± 0.063 | 0.063 | 0.063 | 0.033 (-48%) | 0.063 | 0.063 | 0.033 (-48%) |
| r5 54.001mm | ± 0.125 | 0.125 | 0.125 | 0.125 | 0.084 (-33%) | 0.084 (-33%) | 0.084 (-33%) |
| r4 51.978mm | ± 0.122 | 0.122 | 0.122 | 0.122 | 0.122 | 0.084 (-33%) | 0.084 (-33%) |
| r3 47.067mm | ± 0.116 | 0.116 | 0.116 | 0.116 | 0.116 | 0.077 (-33%) | 0.077 (-33%) |
| r2 44.755mm | ± 0.114 | 0.114 | 0.114 | 0.114 | 0.114 | 0.075 (-34%) | 0.075 (-34%) |
| r1 8.000mm | ± 0.072 | 0.072 | 0.072 | 0.072 | 0.072 | 0.038 (-47%) | 0.038 (-47%) |
| s 2.890mm | ± 0.063 | 0.063 | 0.063 | 0.063 | 0.063 | 0.063 | 0.033 (-48%) |
| w 8.860mm | ± 0.074 | 0.074 | 0.074 | 0.074 | 0.074 | 0.074 | 0.039 (-47%) |
| % SAMPLES IN ± 3 Hz BAND | 84% | 96% | 83% | 82% | 83% | 82% | 98% |
| STND.DEV.(hz) | 2.22 Hz | 1.43 Hz | 2.25 Hz | 2.17 Hz | 2.22 Hz | 2.26 Hz | 1.21 Hz |

TUNED VIBRATION ABSORBERS FOR AC MOTORS

BACKGROUND OF THE INVENTION

1. Field of the Invention

This invention relates to an improvement in the operation of AC motors. More particularly, this invention uses a tuned vibration absorber to suppress the 120 Hz pole noise in AC motors.

2. Description of Related Art

AC synchronous motors are found in a variety of drive applications and are preferable to DC motors when simplicity, reliability and low cost are the design criteria. However, DC motors are typically selected because AC motors have a relatively large 120 Hz velocity error that results from the 60 Hz commutation. This velocity error is approximately three percent of the steady state velocity. Therefore, light-lens xerographic platforms, which are tolerable to 120 Hz electrical pole noise, use an AC motor. Single image black and tri-level systems can also use AC motors. However, laser printing is much more sensitive to velocity errors and can tolerate a velocity error of only 0.25%.

DC motors are usually selected for a high performance apparatus, e.g., digital printers and photoreceptive drive belts, because standard AC motors fail to deliver the required motion quality to xerographic printers. However, the DC motors require feedback operation because of the strict motion quality requirements. Other alternatives to AC motors are the DC servo-controlled motor, which is more costly, or separate motor systems for each driven part of the printer. The DC motor is the typical motor chosen for photoreceptor drives and multiple image color systems because motion quality requirements for digital systems are much more stringent.

A typical 60 Hz synchronous AC motor has 4 poles respectively located at quarter turns in the rotation direction. As the rotor of the motor rotates at 30 rev/s, an oscillation motion of 120 Hz results. Similarly, a typical 50 Hz synchronous AC motor has an oscillation motion of 100 Hz. One way to reduce this oscillation motion is to add inertia to the rotor to reduce the vibration. However, by increasing the inertia, the motor is harder to start and stop. Theoretically, an appropriately sized flywheel could provide adequate attenuation, but it would be so large that there would be significant increases in coast and start-up times. These increases may be so large that start-up may be prevented altogether. The prior art fails to provide sufficient attenuation with minimal addition to system inertia.

SUMMARY OF THE INVENTION

An object of the invention is to provide an AC motor with minimal velocity error.

A further object of the invention is to provide an AC motor with an attenuated 120 Hz excitation frequency.

A further object of the invention is to provide a method of adapting an AC motor such that the oscillation motion at 120 Hz is attenuated.

By mounting a tuned vibration absorber to the rotor armature of an AC synchronous motor, a reduction and near elimination of the 120 Hz oscillation motion results. The tuned vibration absorber sets up an "anti-resonance" at 120 Hz, which significantly attenuates the 120 Hz excitation. This excitation vibration is reduced to a velocity error that meets the motion quality requirements of the apparatus. The motor is used in, for example, a digital printer.

The tuned vibration absorber significantly increases the "effective" inertia without increasing the "dead inertia" created when a flywheel is used for similar attenuation. Thus, motor start-up problems are avoided.

BRIEF DESCRIPTION OF THE DRAWINGS

For better understanding of the invention and further features thereof, reference is made to the following detailed description of the invention to be read in connection with the accompanying drawings, wherein.

DETAILED DESCRIPTION OF THE PREFERRED EMBODIMENTS

While this invention is described in some detail herein, with specific reference to illustrated embodiments, it is to be understood that there is no intent to be limited to these embodiments. On the contrary, the aim is to cover all modifications, alternatives and equivalents falling within the spirit and scope of the invention as defined by the claims.

Figure 1:
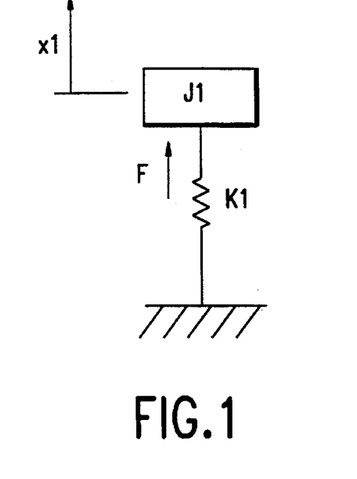
FIG. 1 shows a lumped parameter representation of a single degree of freedom spring-mass system.

FIG. 1 shows a lumped parameter representation of a single degree of freedom spring-mass system. The rotor inertia and the electrical spring are represented by inertia constant $J_1$ and spring constant $K_1$, respectively. The inertia constant is the energy stored in the rotor when operating at rated speed of the motor. The electromagnetic drive force F is applied to the rotor inertia $J_1$. An electrical stiffness results from the compliance of this force F. In reality, the 60 Hz line frequency drives the rotor at 30 rev/s and results in a 120 Hz forcing frequency and a velocity error frequency. Also, a 50 Hz line frequency results in a 100 Hz forcing frequency.

Figure 2:
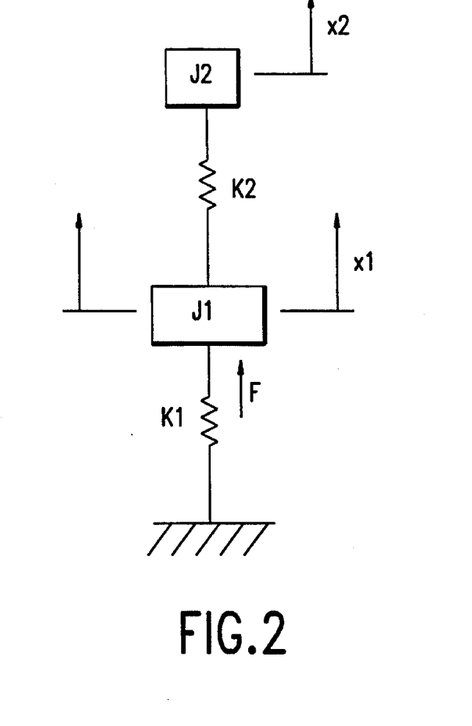
FIG. 2 shows a lumped parameter representation of a two degrees of freedom spring-mass system, which includes a representation of a tuned vibration absorber.

FIG. 2 shows a lumped parameter representation of a two degrees of freedom spring-mass system. As in FIG. 1, the rotor inertia and the electrical spring are represented by inertia constant $J_1$ and spring constant $K_1$, respectively. With two degrees of freedom, the tuned vibration absorber inertia and a second electrical spring are represented by inertia constant $J_2$ and spring constant $K_2$, respectively.

Two important design parameters when designing a tuned vibration absorber are: the tuned resonant frequency $\omega_2$; and the inertia ratio of the tuned vibration absorber inertia $J_2$ to the rotor inertia $J_1$. This inertia ratio is represented as follows:

$$\mu = J_2/J_1 \quad (1)$$

The higher the value of $\mu$, i.e., the higher the tuned vibration absorber inertia is relative to the rotor inertia, the greater the resulting attenuation of the velocity error frequency. However, this increase in inertia has undesirable effects, such as increased coast and start-up times for the motor and increased stresses in the tuned vibration absorber springs. The AC synchronous motor parameter values used in a typical AC motor are shown in Table 1.

TABLE 1

| Parameters | Values |
| --- | --- |
| Rotor Mass | 0.000527 Mg |
| Rotor Inertia, $J_1$ | 0.1452 Mg-mm$^2$ |
| emf Stiffness, $K_1$ | 2446 Mg-mm$^2$/s$^2$ |
| emf Damping, $\zeta_f$ | 32% of Critical |
| Perturbation Amplitude, $F_o$ | 0.620 N-mm |
| Perturbation Frequency, $\omega_f$ | 754 rad/s (120 Hz) |

The electrical stiffness constant K1 and damping coefficient $\zeta_f$ were empirically determined. The perturbation frequency $\omega_f$ was analytically derived and the remaining parameters are vendor specifications.

An ideal tuned vibration absorber generates a resonant frequency that is approximately equal to the forcing frequency $\omega_2$ of the rotor inertia $J_1$. Thus, the tuned vibration absorber generates an anti-resonance, i.e., vibrates out of phase, and absorbs the energy of the perturbations. The equation governing the attenuated amplitude $X_1$ for a simple two degrees of freedom mass and tuned vibration absorbing system of FIG. 2 is as follows:

$$\|x_1\| = X_1 = \frac{[1 - (\omega_f/\omega_2)^2]}{[1 + (K_2/K_1) - (\omega_f/\omega_1)^2][1 - (\omega_f/\omega_2)^2] - (K_2/K_1)} \quad (2)$$

where $$\omega_1 = \sqrt{K_1/J_1}, \quad \omega_2 = \sqrt{K_2/J_2}, \quad f = \omega/2\pi$$

and $\omega_f$ is an angular frequency of the EMF forcing function in radians/sec. The numerator of equation (2) decreases to zero when $\omega_2$ is equal to $\omega_f$. However, this equation does not include the effects of material damping.

The fundamental torsional resonance of the tuned vibration absorber is designed to be coincidental with the torsional disturbance that needs to be attenuated. In the case of the 60 Hz synchronous AC motor, that disturbance is 120 Hz for a 60 cycle power source.

Figure 3:
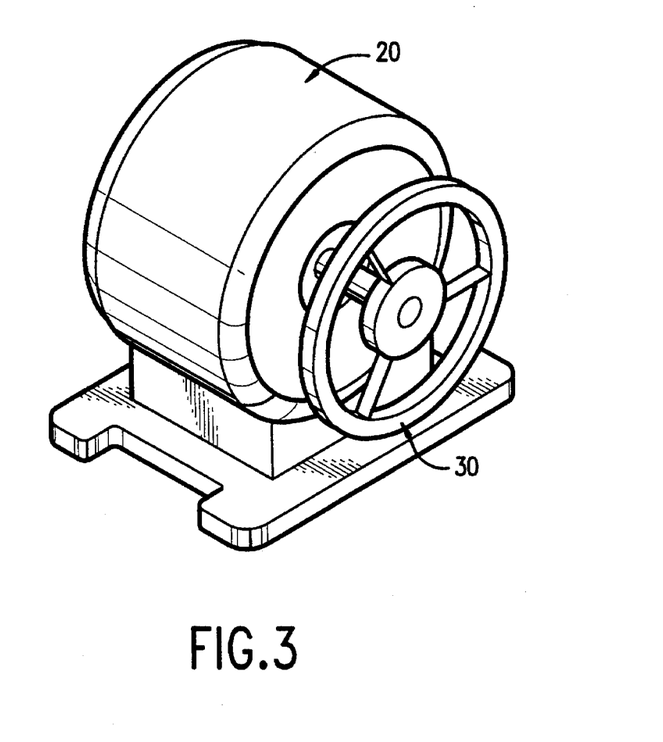
FIG. 3 is an AC motor with a tuned vibration absorber attached.

Referring to FIG. 3, a tuned vibration absorber 30 of the first preferred embodiment is attached to the rotor of an AC motor 20. Various shapes and designs of the tuned vibration absorber 30 can be used.

Figure 4:
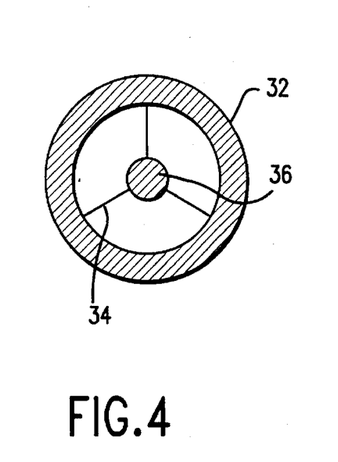
FIG. 4 is a tuned vibration absorber of the first preferred embodiment.
Figure 5:
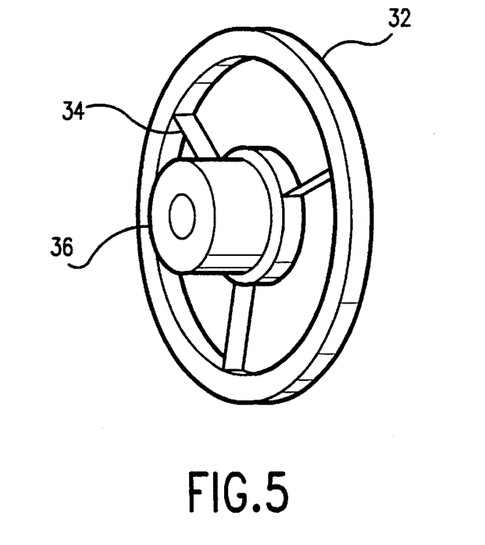
FIG. 5 is a three-dimensional view of the first preferred embodiment shown in FIG. 4.

FIG. 4 shows a front view of the tuned vibration absorber 30 of the first preferred embodiment. FIG. 5 is a three-dimensional view of the tuned vibration absorber 30 of the first preferred embodiment. The inertia ring 32 is designed to be massive and "rigid". The flexible springs 34 are designed to be flexible and allow the inertia ring 32 to move out of phase with the excitation frequency of the motor. Thus, the flexible springs of the tuned vibration absorber are chosen to produce the required fundamental torsional resonance of the inertia ring 32. The mounting hub 36 mounts onto the drive shaft of the AC synchronous motor 20.

Figure 6:
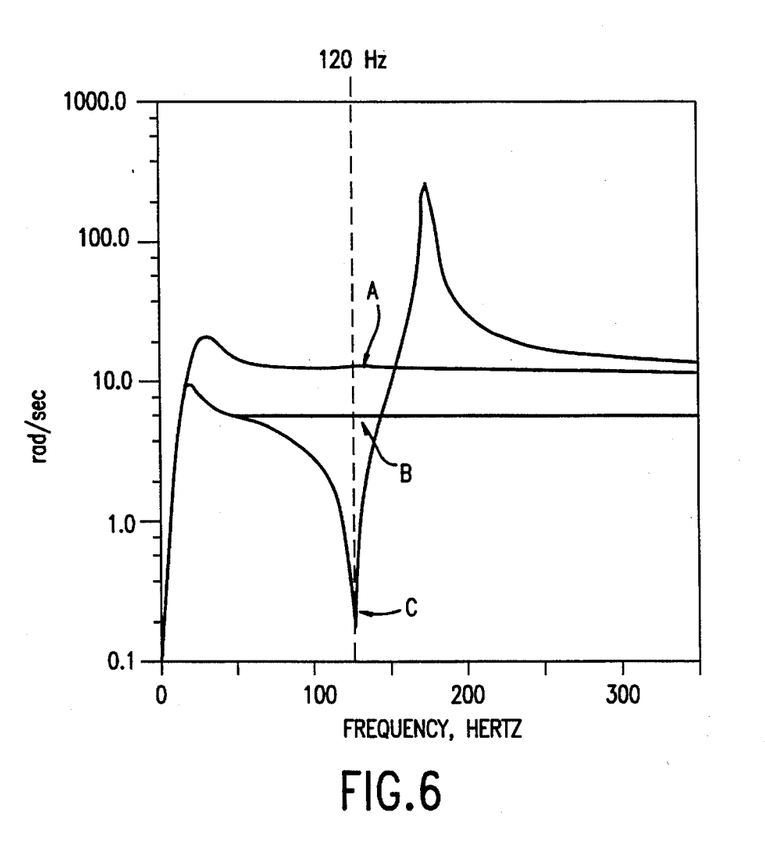
FIG. 6 is a graph of the main drive motor frequency response due to motor armature excitation.

Referring to the graph of FIG. 6, lines A–C represent finite element models and calculations. Line A represents an AC motor without any inertia. Line B represents an AC motor with dead inertia, for example, a flywheel. Line C represents an AC motor with the tuned vibration absorber of the first preferred embodiment. The amount of dead inertia added to the motor armature is equal to the armature inertia of the motor used to generate line A. Therefore, the total inertia is doubled. The inertia added using the tuned vibration absorber is also equal to the armature inertia of the motor. The flexible springs of the tuned vibration absorber were chosen such that when the hub of the tuned vibration absorber is fixed, a fundamental torsional resonance of the outer inertia ring of 120 Hz is produced.

When the tuned vibration absorber is connected to the motor armature, the electro-mechanical resonance of the AC motor, which is approximately 20 Hz, is combined with the design resonance of 120 Hz in the tuned vibration absorber. Thus, two system resonances are generated: one lower resonance at 14.6 Hz; and one higher resonance at 168.8 Hz. More importantly, an anti-resonance is generated at precisely 120 Hz, which is apparent in line C.

Line A of FIG. 6 shows that the motor armature without any inertia produces a 11.57 rad/s of excitation at 120 Hz. With the motor armature connected to a dead inertia, the excitation is reduced to 5.7 rad/s as shown by line B. The dead inertia reduces the 120 Hz response in the motor by a factor of only 2:1. When the motor armature is connected to the tuned vibration absorber of the first preferred embodiment, the excitation and disturbance was reduced to 0.23 rad/s as shown by line C. Thus, the tuned vibration absorber reduces the 120 Hz response in the motor armature by a factor of 50:1. Therefore, the tuned vibration absorber significantly reduces the excitation vibration produced by the 120 Hz AC motor.

Figure 7:
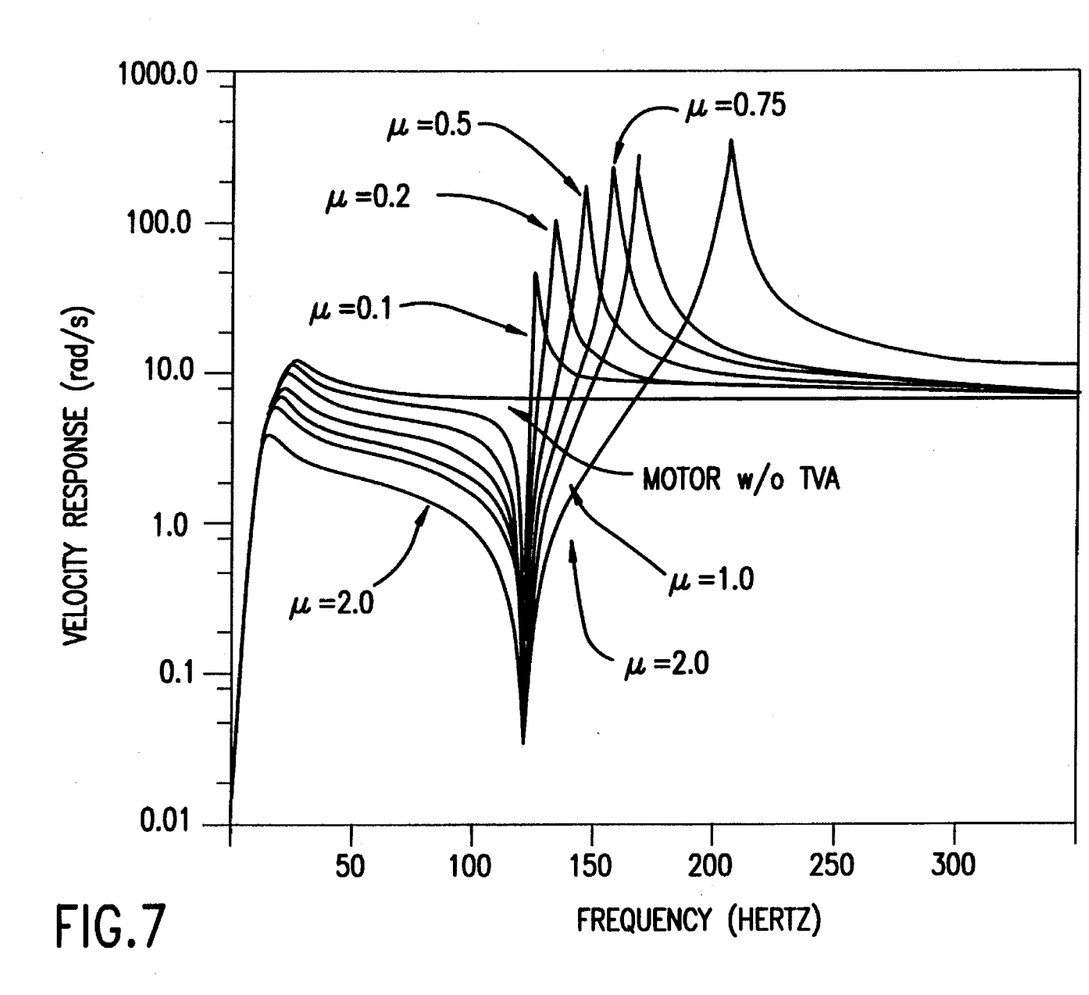
FIG. 7 is a semi-log frequency response curve of a motor using a tuned vibration absorber with material damping of 0.5%.
Figure 8:
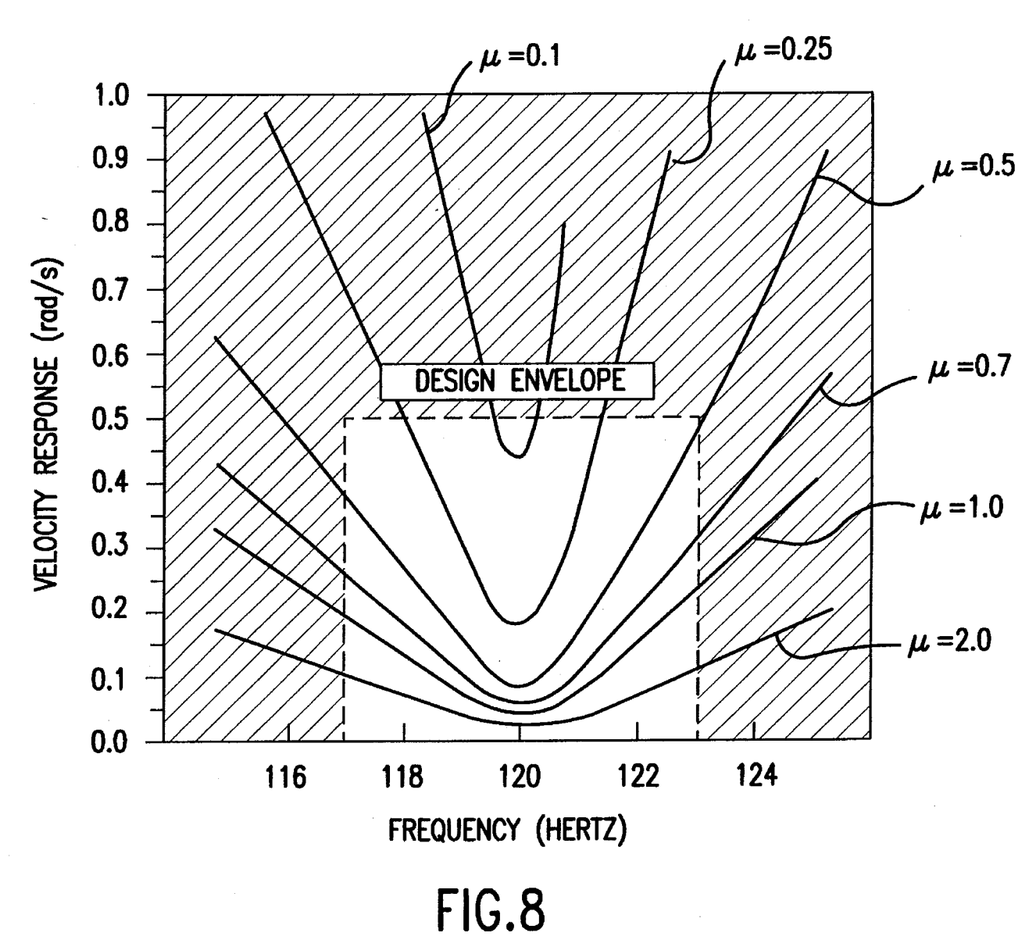
FIG. 8 shows frequency response plots for a motor using a tuned vibration absorber with material damping of 0.5%.

To understand the dynamic effect of damping, an AC motor with a tuned vibration absorber was operated with various damping rates and inertia ratios $\mu$. FIGS. 7 and 8 show the velocity response curves with a damping rate of 0.5 percent. By varying the inertia ratios $\mu$, different graph lines are formed. However, each graph line shows an attenuation of the electrical disturbance at 120 Hz. Better attenuation occurs as the inertia $J_2$ of the tuned vibration absorber is increased relative to the rotor inertia $J_1$, i.e., an increase in the inertia ratio $\mu$. Better attenuation also occurs when the tuned vibration absorber resonant frequency becomes equal to the forcing frequency $\omega_f$.

Figure 9:
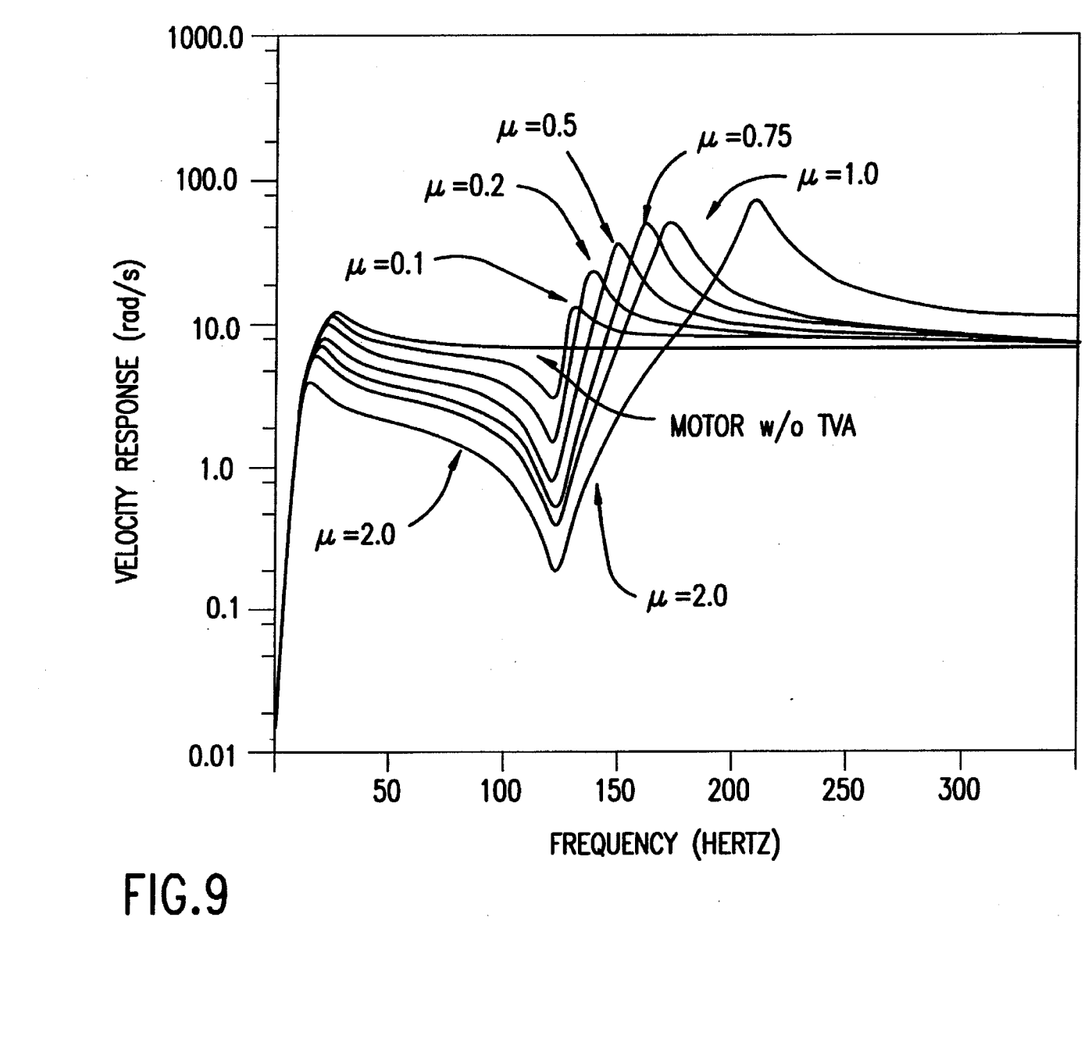
FIG. 9 is a semi-log frequency response curve of a motor using a tuned vibration absorber with material damping of 3%.
Figure 10:
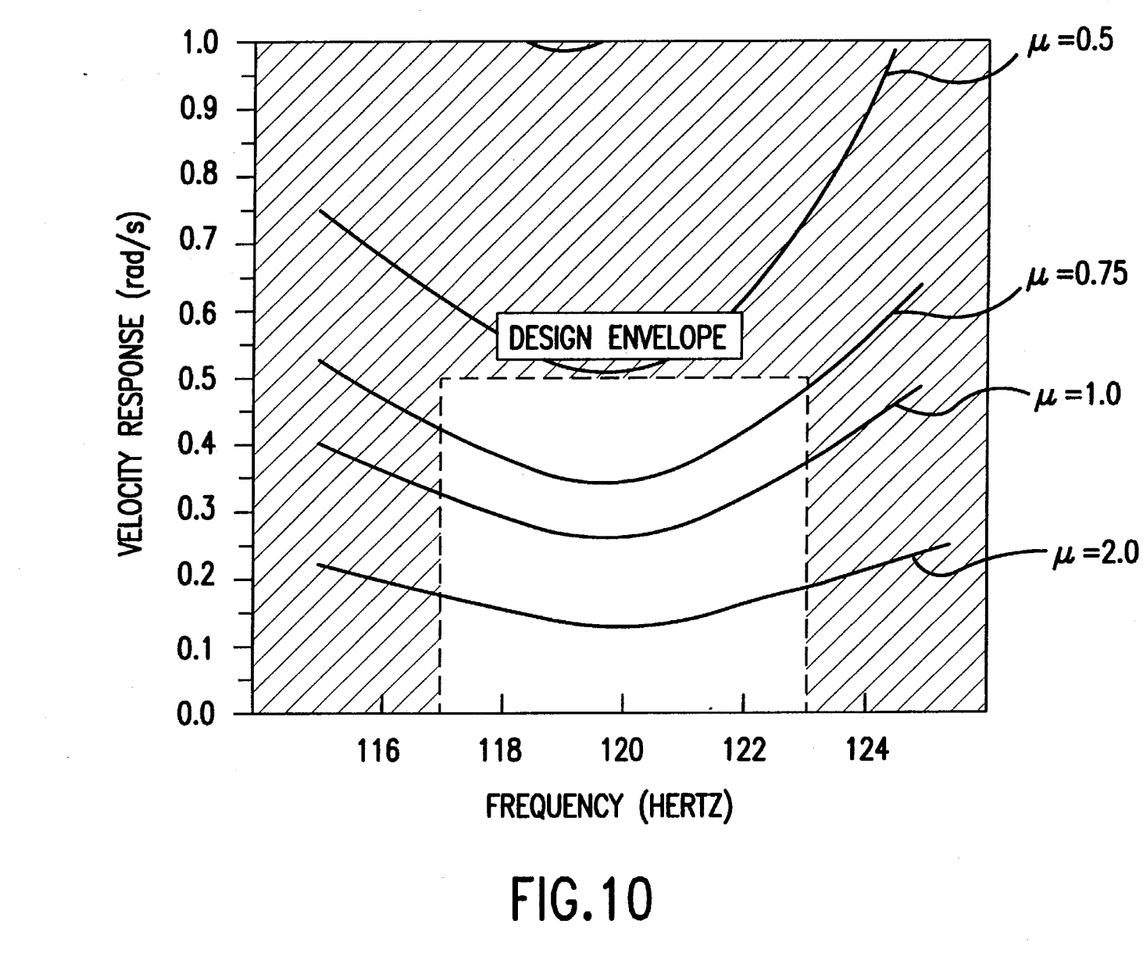
FIG. 10 shows frequency response plots for a motor using a tuned vibration absorber with material damping of 3%.

FIGS. 9 and 10 show the velocity response curves with a damping rate of three percent and various p ratios. In FIG. 10, the attenuation with an inertia ratio $\mu$ of 2.0 is not as good as the attenuation with the same inertia ratio in FIG. 8. Therefore, the damping rate should be reduced as much as possible. Attenuation of 100% occurs when the tuned vibration absorber resonance is identical to the forcing frequency and the damping rate is zero. Although zero damping is impossible, it is crucial that the damping be minimized in order to maximize attenuation for any given $\mu$ ratio.

Figure 11:
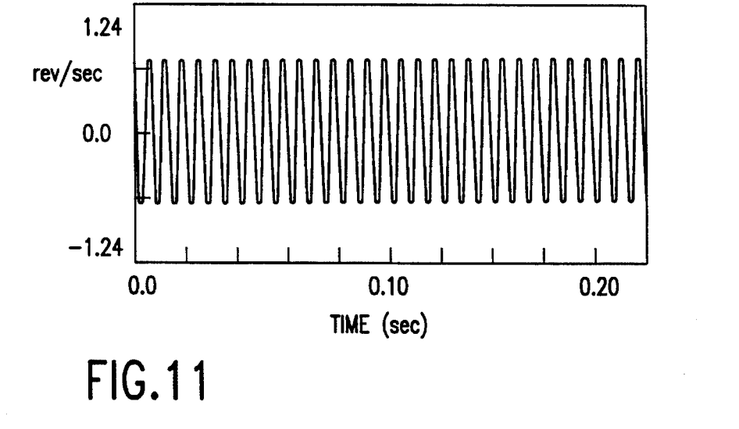
FIG. 11 shows a velocity vs. time plot of the 120 Hz pole noise error in a main drive motor.
Figure 12:
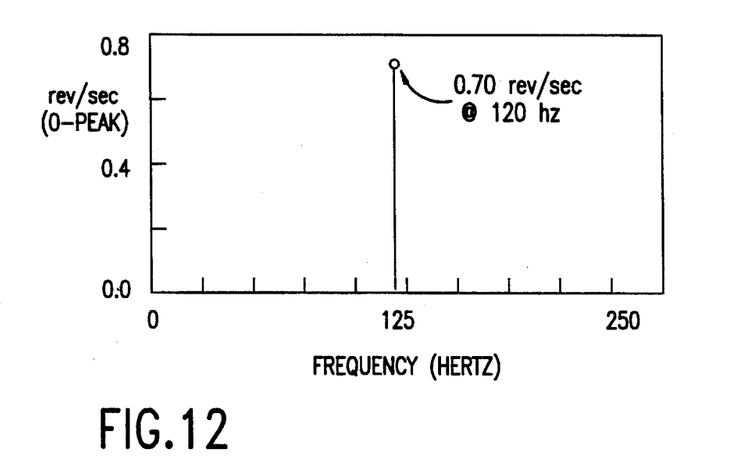
FIG. 12 shows the Fast Fourier Transform (FFT) of the main drive motor time response showing 120 Hz pole noise error.

FIGS. 11–16 show velocity vs. time plots and velocity vs. frequency plots for AC motors. Referring to FIG. 11, the AC coupled velocity versus time signal for an AC motor with a bare armature shows the motor pole noise at the 120 Hz frequency. In FIG. 12, the velocity error is determined by performing a Fast Fourier Transform (FFT) of the signal to determine a zero to peak amplitude of 0.70 rev/s at 120 Hz.

Figure 13:
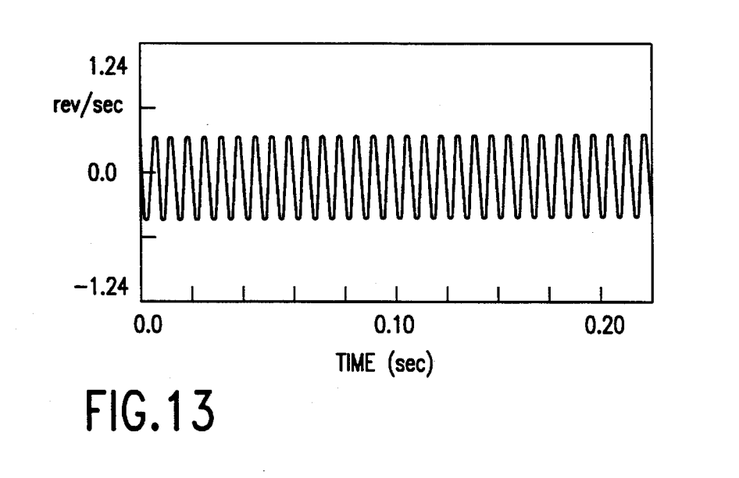
FIG. 13 is a velocity vs. time plot of the main drive motor with dead inertia added.
Figure 14:
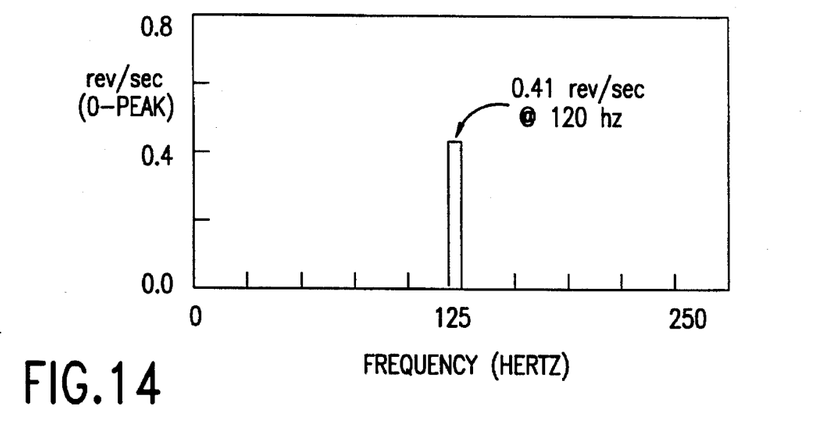
FIG. 14 is the FFT of the main drive motor time response with dead inertia added.

An AC motor with a dead inertia equivalent to the armature inertia was used to generate FIGS. 13 and 14. There is approximately a 2:1 decrease in the excitation amplitude at 120 Hz when the armature inertia is doubled by attaching the dead inertia. After performing a Fast Fourier Transform of this signal, a zero to peak amplitude of 0.41 rev/s at 120 Hz results as shown in FIG. 14.

Figure 15:
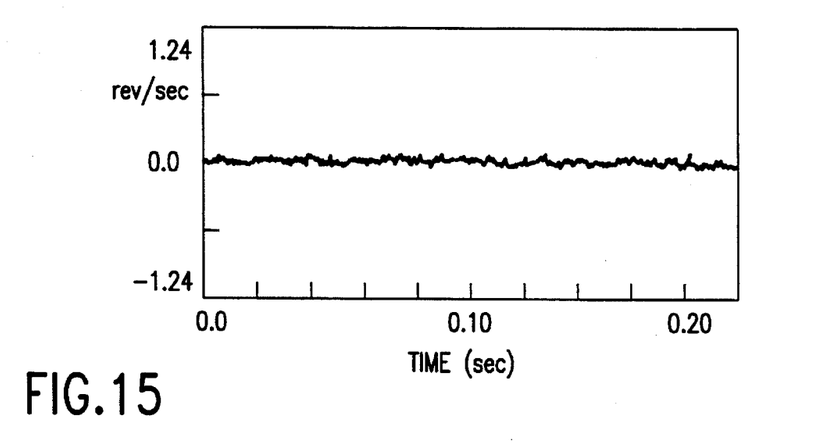
FIG. 15 is the velocity vs. time plot of the main drive motor with the tuned vibration absorber.
Figure 16:
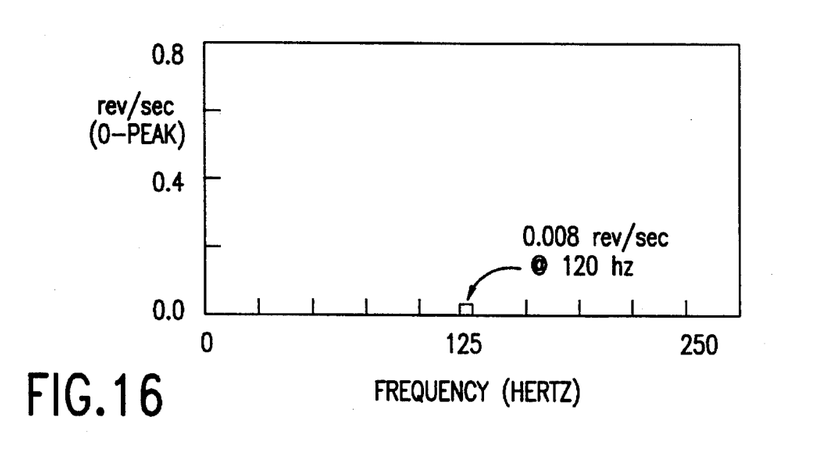
FIG. 16 is the FFT of the main drive motor time response with a tuned vibration absorber.

An AC motor with a tuned vibration absorber was used to generate FIGS. 15 and 16. With the same inertia as the dead inertia, the tuned vibration absorber decreases the resonance by a factor of 80:1. Thus, the final velocity error is less than 0.03 percent. This is a significant improvement over AC motors without tuned vibration absorbers.

As described above, the unattenuated drive motor has a 0.7 rev/s (4.5 rad/s) velocity error, which is 2.4% of its 30 rev/s (188.5 rad/s) nominal velocity. The velocity error goal of 0.25% zero to peak of nominal is selected as the minimum allowable velocity error because of the requirements of single-color xerographic laser printers. In order to reduce this velocity error to 0.25% of nominal (0.47 rad/s), the tuned vibration absorber must provide a 90% reduction in amplitude. Using the velocity response curve of FIG. 10 for 3% damping, the inertia ratio $\mu$ of 0.5 or less yields velocity responses completely above the 0.47 rad/s maximum.

In FIG. 10, the design envelope has a maximum velocity response at 0.47 rad/s and a width of 120±3 Hz. An inertia ratio of 0.7 is selected since the value affords velocity response consistently below the 0.47 rad/s threshold and still allows the tuned vibration absorber to have resonant frequency with an excitation frequency deviation of as much as 3 Hz.

FIG. 16 shows the Fast Fourier Transform of the signal in FIG. 15 where the zero to peak amplitude is 0.008 rev/s at 120 Hz. Thus, the tuned vibration absorber produces a 99% attenuation error amplitude reduction while the addition of a dead inertia produces only a 41% reduction. For a given inertia, a tuned vibration absorber is much more effective in the suppression of AC motor pole noise than that of a simple flywheel inertia. Therefore, any increase in cost or complexity of the tuned vibration absorber is justifiable.

The design and parameters of the tuned vibration absorber are important to achieve good performance. There are four factors that determine attenuation ability of a tuned vibration absorber: the amount of material damping in the tuned vibration absorber's "springs" $\zeta$; the tuned vibration absorber's resonant frequency $f_2$; the tuned vibration absorber's inertia ratio $\mu$; and the dynamic properties of the motor itself. The first three factors are determined by the design of the tuned vibration absorber.

In the tuned vibration absorber of the first preferred embodiment, the following equation determines the effective stiffness $K_{spoke}$ of the tuned vibration absorber's spokes:

$$K_{spoke} = \frac{Ewt^3}{3} \left[ \frac{1}{L} + \frac{3r_i}{L^2} + \frac{3r_i^2}{L^3} \right] \qquad (3)$$

where E is the material elasticity (flexural modulus); $r_i$ is a hub radius; w is the spoke width; L is the spoke length; and t is the spoke thickness. An increase in the spoke thickness has the largest effect on the effective stiffness of the tuned absorber's "springs".

Referring again to FIG. 5, a three-spoke steel design with a rectangular outer ring cross section is shown as the first preferred embodiment. It is preferable to manufacture this tuned vibration absorber with wire EDM construction to allow the spoke, outer ring and inner hub to be constructed from one continuous piece of steel. This eliminates the need to precisely locate and fasten the spokes between the hub and ring. If the spokes, which act like springs in the tuned vibration absorber, were rigid, then the device would perform like a flywheel with an inertia equal to that of the outer ring. Therefore, the dimensions of the tuned vibration absorber and the characteristics of the steel must be considered to form a tuned vibration absorber that attenuates the velocity error. Table 2 shows the dimensions and parameters of the tuned vibration absorber that achieves the attenuation properties required.

TABLE 2

| Parameters | Values |
| --- | --- |
| Damping, $\zeta$ | 0.5% of Critical |
| Elasticity, E | 207000 N/mm$^2$ |
| Density, $\rho$ | 7.93 × 10$^{-9}$ Mg/mm$^3$ |
| Poisson's Ratio, Y | 0.29 |
| Number of Spokes, N | 3 |
| Inertia Ring Outer Radius | 43.995 mm |
| Inertia Ring Inner Radius | 40.170 mm |
| Hub Radius, ri | 8.0 mm |
| Spoke Width, w | 5.0 mm |
| Spoke Legnth, L | 32.170 mm |
| Spoke Thickness, t | 0.890 mm |
| Spring Stiffness, K2 | 41300 Mg-mm$^2$/s$^2$ |
| Inertia, J2 | 0.0726 Mg-mm$^2$ |
| Inertia Ratio, $\mu$ | 0.5 |

Figure 17:
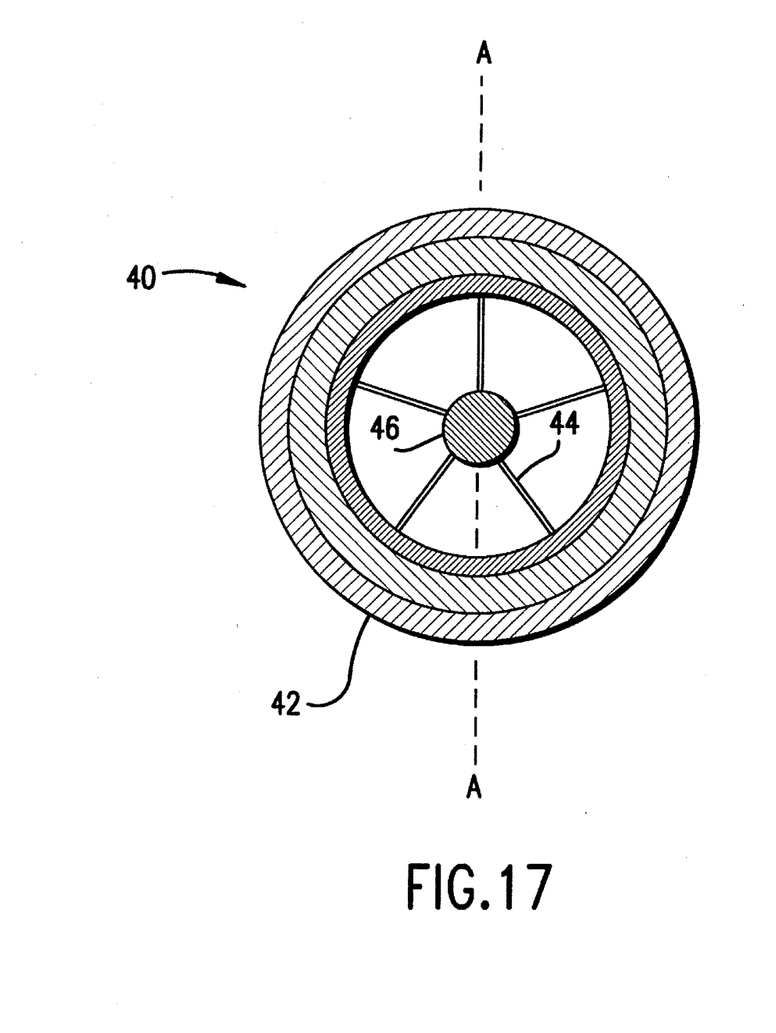
FIG. 17 is a second preferred embodiment of a tuned vibration absorber.
Figure 18:
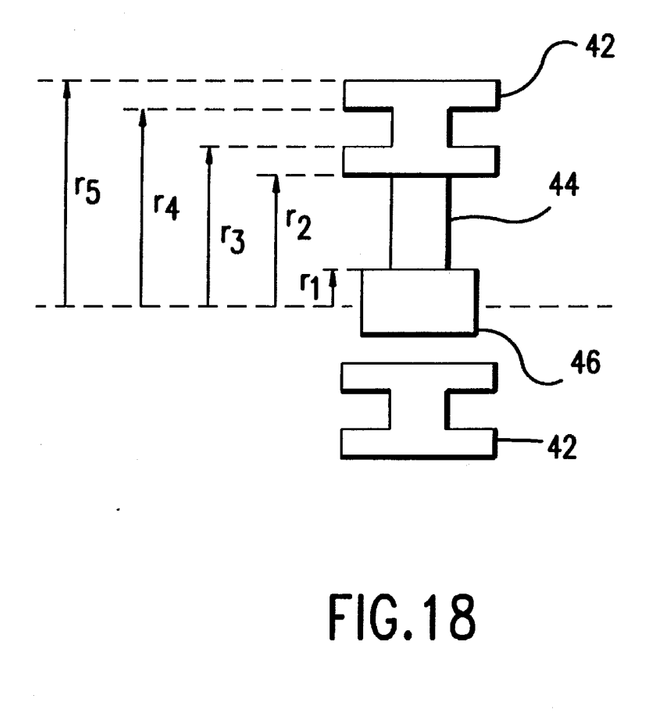
FIG. 18 is a cross-sectional view of the second preferred embodiment through line A—A of FIG. 17.

When manufacturing large quantities of tuned vibration absorbers, plastic is preferable to steel. In order to adapt the steel design to an all plastic configuration, certain geometric changes are made to accommodate injection molding. Referring to FIG. 17, a tuned vibration absorber of the second preferred embodiment is shown. Instead of the rectangular cross section of the steel design, the plastic tuned vibration absorber 40 has an inertia ring 42 with an I-beam cross section. Spokes 44 connect the inertia ring 42 to the hub 46. FIG. 18 is a cross-sectional view of the plastic tuned vibration absorber shown in line A—A of FIG. 17. The structure of the plastic tuned vibration absorber is not limited to this structure.

The plastic material used, for example, is GE's Plastics HV7065 valox. This plastic has a relatively low flexural modulus and a relatively high density. This combination of properties allows for a relatively thick spoke cross section for a given outer diameter, which facilitates radial flow of injected plastic. Properties and dimensions of the plastic tuned vibration absorber are shown in Table 3.

TABLE 3

| Parameters | Values |
| --- | --- |
| Damping, $\zeta$ | 2.8% of Critical |
| Elasticity, E | 5240 N/mm$^2$ |
| Density, $\rho$ | 2.40 × 10$^{-9}$ Mg/mm$^3$ |
| Poisson's Ratio, Y | 0.38 |
| Number of Spokes, N | 5 |
| Inertia Ring Outer Radius | 54.001 mm |
| Inertia Ring Inner Radius | 44.755 mm |
| Hub Radius, ri | 8.0 mm |
| Spoke Width, w | 8.86 mm |
| Spoke Length, L | 36.755 mm |
| Spoke Thickness, t | 2.569 mm |
| Spring Stiffness, K2 | 57830 Mg-mm$^2$/s$^2$ |
| Inertia, J2 | 0.1017 Mg-mm$^2$ |
| Inertia Ratio, $\mu$ | 0.7 |

The primary objective of the tuned vibration absorber is to provide maximum vibration attenuation with minimal addition of inertia. By varying the three factors that determine attenuation in the tuned vibration absorber (material damping $\zeta$, resonant frequency $f_2$, and inertia ratio $\mu$), most critical parameters can be determined.

An analysis of 1000 random samples of the plastic tuned vibration absorber of the second preferred embodiment were tested by changing the manufacturing tolerances. The tuned vibration absorbers were manufactured by injection molding with a 30% glass-fill polyester thermal plastic similar to valox. Preferred tolerances for material elasticity and density were assumed to be 10% and 2%, respectively. The table of FIG. 19 shows the relative sensitivity of the tuned vibration absorber's resonant frequency to variations in the tolerances allowed in the design parameters.

Figure 19:
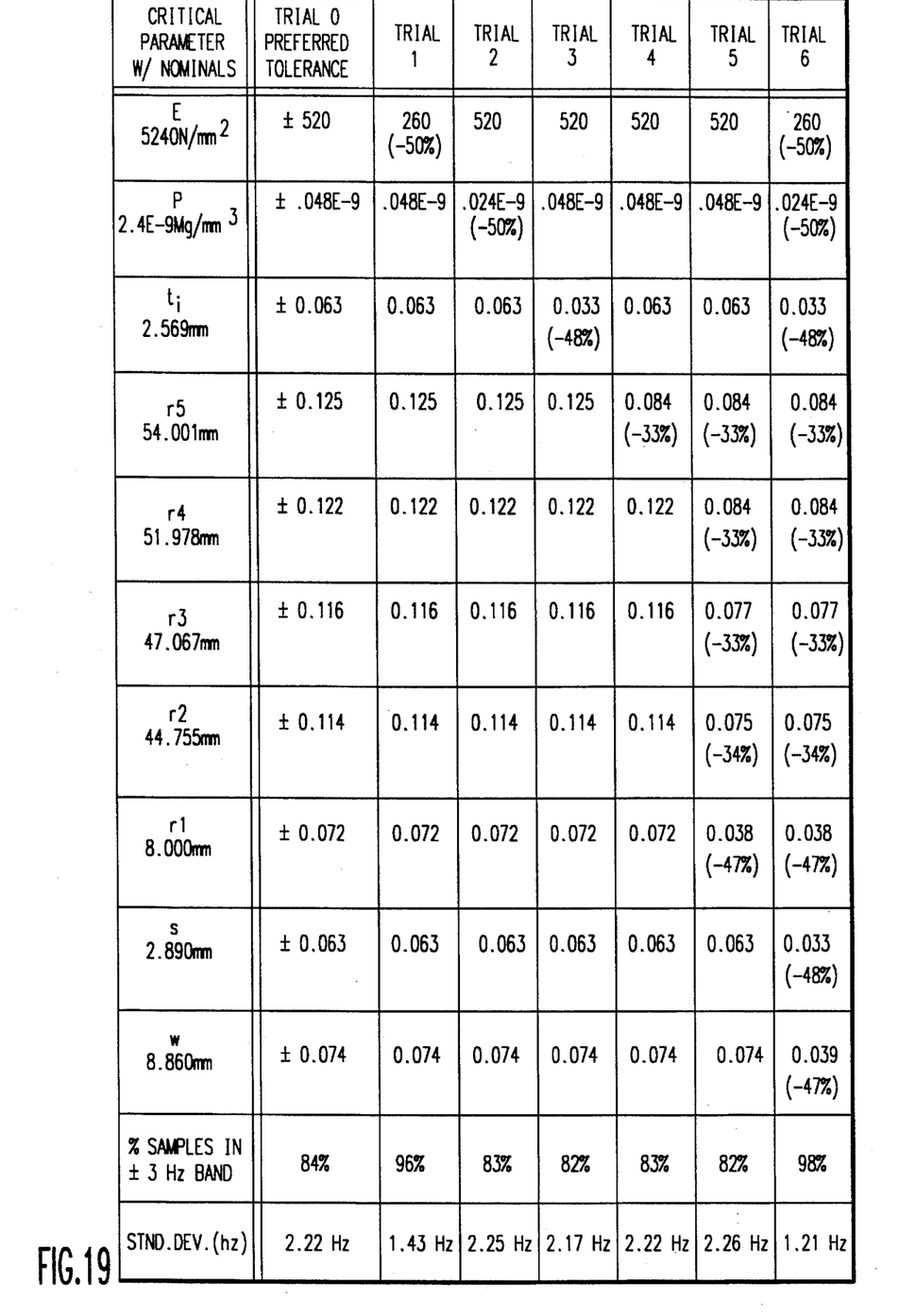
FIG. 19 is a table for analyzing critical parameters in designing a tuned vibration absorber.

Referring to FIG. 19, trial 0 was performed to test the preferred tolerance for each of the measured parameters: the material elasticity E; the material density $\rho$; the spoke thickness $t_s$; the various radii of the I-beam inertia ring (see FIG. 18) $r_2$–$r_5$; the radius of the hub $r_1$; I-beam web section thickness s; and the spoke width w. For example, the material elasticity E is 5240 N/mm$^2$ with a preferred tolerance of ±520 N/mm$^2$. The number of tuned vibration absorbers that produced resonant frequencies that fall within the acceptable range of ±3 Hz, i.e., 117–123 Hz range, using the preferred tolerance was 84% with a standard deviation of 2.22 Hz.

In trial 1, the tolerance of the material elasticity E (flexural modulus of the plastic) was reduced by 50%. The other tolerances were unchanged. The number of samples within the acceptable resonance frequency band was increased to 96% with a standard deviation of only 1.43 Hz. This is a considerable improvement over the tolerance used for the tuned vibration absorber in trial 0. By tightening the tolerance of the material elasticity, the attenuation properties increased dramatically.

In trial 2, the tolerance of the material density p was reduced by 50%. The tolerances of the material elasticity, spoke thickness and radii were held constant, i.e., the same as trial 0. The number of samples within the acceptable resonance frequency band was 83% with a standard deviation of 2.25 Hz. Thus, changing the tolerances of the material density had little effect on the attenuation properties of the tuned vibration absorber.

Trial 3 reduced the tolerance of the spoke thickness by 48%. The number of samples within the acceptable resonance frequency band was 82% with a standard deviation of 2.17 Hz. Thus, reducing the tolerance of the thickness of the spokes also has little effect.

Trial 4 reduced the acceptable tolerance of the outer radius $r_5$ (radius from hub center to external side of I-beam) by 33%. The number of samples within the acceptable resonance frequency band was 83% with a standard deviation of 2.22 Hz. Trial 5, also reduced the acceptable tolerances of radii $r_1$ to $r_5$ to achieve 82% of the samples in the acceptable resonance frequency band. Therefore, changing the tolerances of the radii has little effect on the attenuation properties of the tuned vibration absorber.

Trial 6 adjusted the tolerances for all of the parameters to achieve 98% of the samples in the acceptable resonance frequency band. The standard deviation was 1.21 Hz. Thus, the best attenuation properties are achieved by tightening the tolerances of all of these parameters.

In conclusion, the foremost influential parameters in decreasing order are: first, material elasticity; second, material density; third, spoke thickness; and fourth, outer radius $r_5$. This sensitivity suggests the need for relatively tight tolerances on these parameters. However, changing the material elasticity is the most important factor in increasing the number of samples that produce an acceptable performance.

There are several other factors that a designer must consider when designing a tuned vibration absorber for an AC motor. As shown in FIG. 6, another system resonance frequency occurs above the tuned vibration absorber design frequency. Thus, the designer must be careful to avoid exciting that frequency. However, the most troublesome frequency could be that of the output pinion gear of the motor armature. Assuming a 10 tooth gear, the excitation at 30 rev/s would be 300 Hz. This should be far enough removed from the system resonance at 168.8 Hz (see FIG. 6) that a gain due to gear noise would not be experienced.

The dynamic response of the entire photoreceptor system may affect the resonant frequencies. Because AC motors run at 30 rev/s, the effective main drive motor inertia relative to the rest of the major inertias of the typical photoreceptor system is proportional to the square of the $$\frac{J_1}{J_x} \propto \left(\frac{v_1}{v_x}\right)^2 \qquad (4)$$

where $J_1$ is the motor inertia; $J_x$ is the combined inertias in the apparatus; $v_1$ is the speed of the motor drive; and $v_x$ is the speed of the motor drives in the apparatus generating the apparatus inertias. The main drive motor armature is several orders of magnitude higher than the rest of the system. As a result of equation (4), the dynamic response of the tuned vibration absorber/motor armature system can be considered independent of the dynamic response of the rest of the drive system.

Improvement in attenuation properties can occur by individual tuning of the tuned vibration absorber's natural resonance. Automated laser cutting processes similar to the ones used to perform high speed rotor balancing could easily be applied to precisely tune the system to 120 Hz and still keep the cost of the AC motor/tuned vibration absorber system lower than DC servomotor systems.

Changing the design of the tuned vibration absorber is another method. Attenuation properties are affected by insertion of lead springs into the inertia rings and hubs of plastic.

The first and second preferred embodiments use a spoke-wheel concept. These tuned vibration absorbers are the most practical because they employ several flexible spokes that connect the outer inertia ring to the inner hub. The spokes are strong in tension and compression, but bend in compliance with a torque force from the motor. This combination results in a high radial stiffness and relatively low torsional stiffness, which are desirable characteristics for this type of rotational device. However, FIGS. 20–26 show seven other designs for tuned vibration absorbers.

Figure 20:
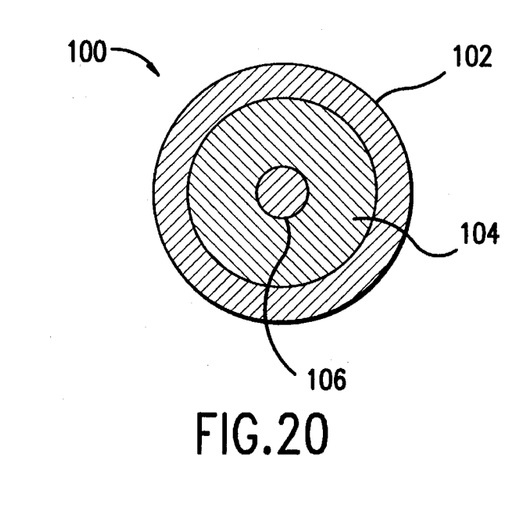
FIG. 20 shows a third preferred embodiment of a tuned vibration absorber using a concentric inertia ring attached to a hub via an elastomeric medium.

FIG. 20 shows a tuned vibration absorber 100 of the third preferred embodiment. A concentric inertia ring 102 is attached to the hub 106 by using an elastomeric medium 104. The elastomeric medium is flexible and has the proper spring characteristics. The elastomer filled design uses a solid elastomeric medium to connect the outer inertia ring 102 to the inner hub 106. Presently, the damping ratio typically found in elastomers are well above the three percent level. However, this design may be practical with the development of new elastomers with damping ratios below three percent.

Figure 21:
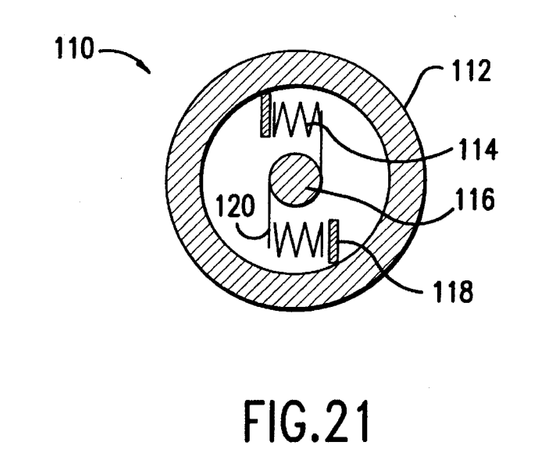
FIG. 21 shows a fourth preferred embodiment of a tuned vibration absorber using a concentric inertia ring attached to the hub via tension/compression springs.
Figure 27:
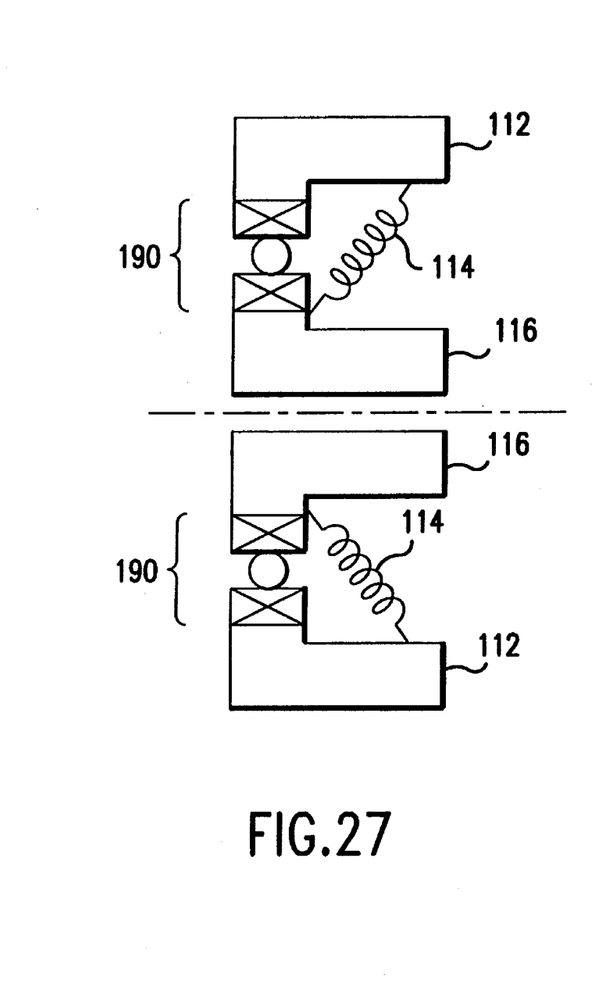
FIG. 27 shows the bearing structure for the fourth and sixth preferred embodiments.

FIG. 21 shows a tuned vibration absorber 110 of the fourth preferred embodiment. A concentric inertia ring 112 is attached to rotor hub 116 via tension/compression springs 114. The concentric ring 112 and hub 116 have flanges 118 and 120, respectively. Springs 114 connect each flange 118 to flange 120. A separate bearing structure illustrated in FIG. 27 is required to provide support for the inertia ring 112 because the springs 114 are not rigid enough to provide radial support. Bearings 190 are mounted between inertia ring 112 and hub 116 to allow the rotation of the inertia ring 112.

Figure 22:
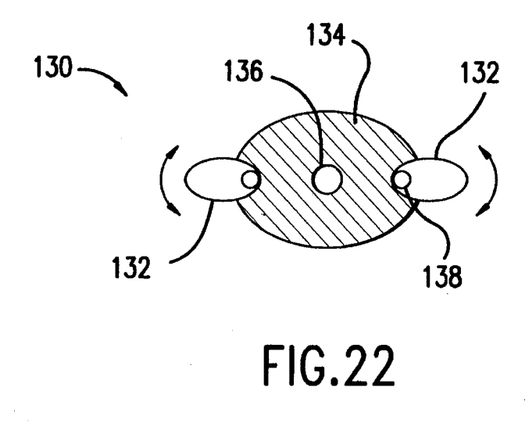
FIG. 22 shows a fifth preferred embodiment of a tuned vibration absorber using opposing tuned pendulums attached to a hub.

FIG. 22 shows a tuned vibration absorber 130 of the fifth preferred embodiment. The hub 136 is attached to oblong plate 134. Opposing tuned pendulums 132 are attached to the plate 134 at locations 138. As the plate 134 spins, the pendulums 132 rotate freely around locations 138 to provide the necessary inertia to suppress the AC motor pole noise.

Figure 23:
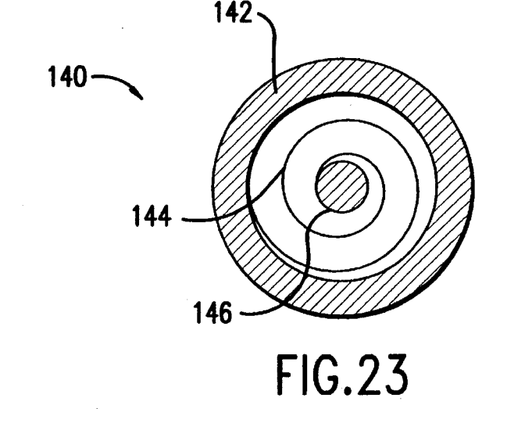
FIG. 23 shows a sixth preferred embodiment of a tuned vibration absorber using a torsional spring connecting a hub to a concentric inertia ring.

FIG. 23 shows a tuned vibration absorber 140 of the sixth preferred embodiment. A torsional spring 144 couples the concentric inertia ring 142 and the hub 146. Similar to the fourth preferred embodiment, a separate bearing structure shown in FIG. 27 is needed to provide support for the inertia ring 142 because the torsional spring 144 is not rigid enough to provide radial support.

Figure 24:
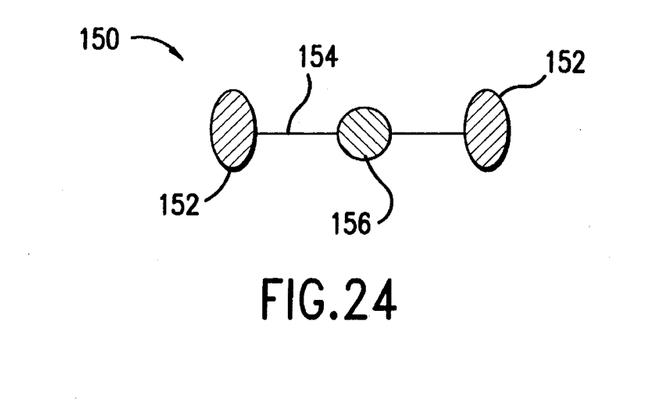
FIG. 24 is a seventh preferred embodiment of a tuned vibration absorber using cantilever springs connecting orbital masses to a hub.

FIG. 24 shows a tuned vibration absorber 150 of the seventh preferred embodiment. Orbital masses 152 are attached to the rotor hub 156 by cantilever springs 154. The orbital masses 152 provide the necessary inertia to suppress the AC motor pole noise as they rotate.

Figure 25:
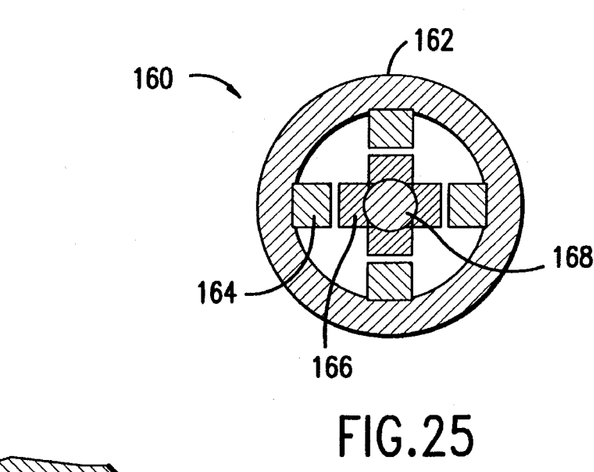
FIG. 25 is an eighth preferred embodiment of a tuned vibration absorber using electro-mechanical equivalents to produce spring constants.
Figure 28:
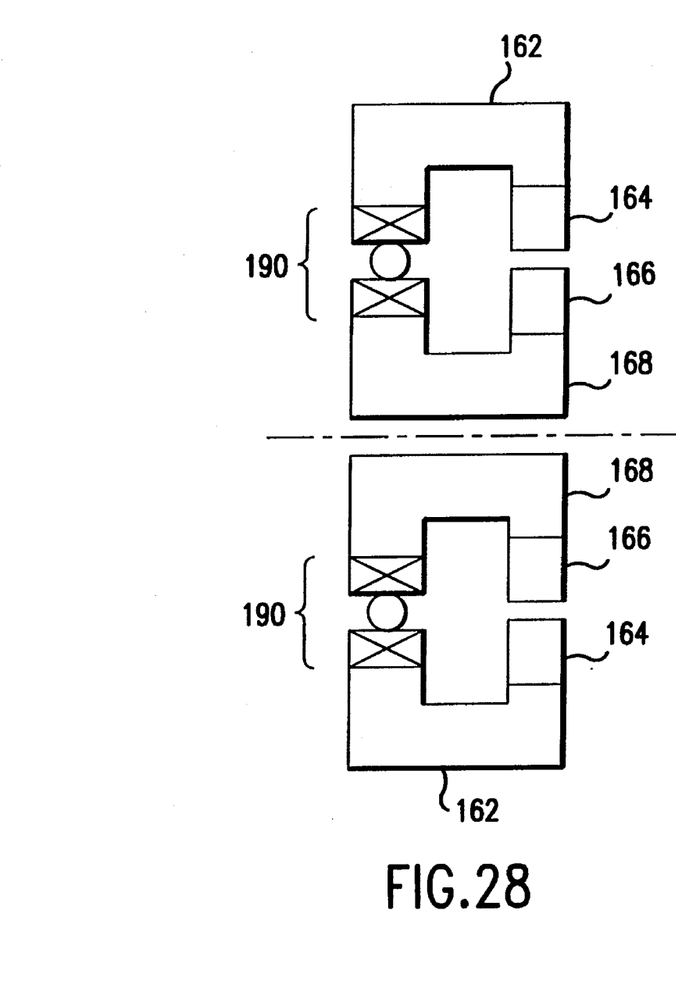
FIG. 28 shows the bearing structure for the eighth preferred embodiment.

FIG. 25 shows a tuned vibration absorber 160 of the eighth preferred embodiment. An electro-mechanical system uses electromotive force (EMF) to produce a spring constant. The inertia ring 162 rotates around the hub 168. Magnets 164 and 166 behave like electrical springs by forming magnetic fields that provide the drag for the rigid inertia ring 162. FIG. 28 shows a separate bearing structure 190 that provides support for the inertia ring 162.

Figure 26:
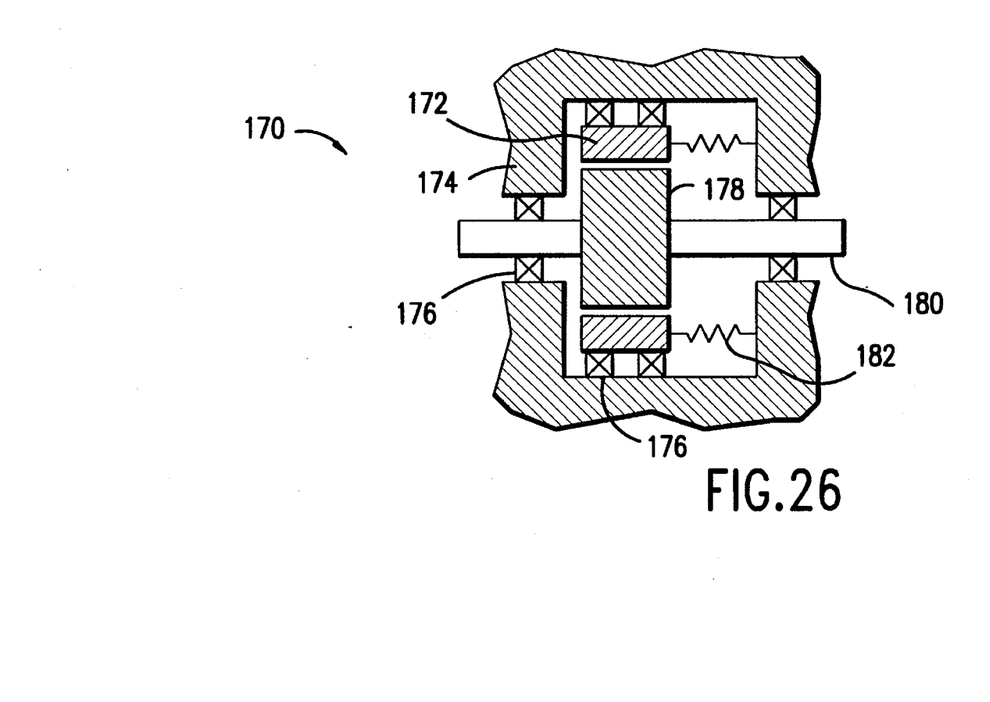
FIG. 26 is a ninth preferred embodiment of a tuned vibration absorber using an electrical stator as the inertia and springs from the stator to ground to produce the required stiffness.

FIG. 26 shows a tuned vibration absorber 170 of the ninth preferred embodiment. The tuned vibration absorber is adjustable by changing the electric current supplied to the rotor/stator windings. The tuned stator has a rotor 178 attached to the rotor shaft 180. Armature 172 is connected to the motor housing 174 via the bearings 176. As the current is changed in the armature 172, the magnetic resistance changes and produces the correct inertia to suppress the AC motor pole noise.

These sample designs for tuned vibration absorbers are only examples. Any design that attenuates the undesirable frequencies generated by the AC motor are intended to be covered by the spirit and scope of the invention.

Although the invention has been described and illustrated with particularity, it is intended to be illustrative of preferred embodiments. It is understood that the disclosure has been made by way of example only. Numerous changes in the combination and arrangements of the parts, steps and features can be made by those skilled in the art without departing from the spirit and scope of the invention, as hereinafter claimed.

What is claimed is:

1. A tuned vibration absorber for attenuating an angular velocity error in a motor comprising:

a hub connected to an armature shaft of the motor;

an I-beam shaped inertia ring for generating an inertia to the armature shaft; and a plurality of spokes for providing a torsional resonance of the inertia ring, each spoke directly coupling the inertia ring and the hub, wherein the inertia ring and the plurality of spokes have a combined resonant frequency approximately equal to a forcing frequency of the armature shaft that produces an anti-resonance to attenuate the angular velocity error in the motor.

2. The tuned vibration absorber of claim 1, wherein the motor is a 60 Hz AC motor.

3. The tuned vibration absorber of claim 2, wherein the angular velocity error is an excitation vibration produced by the 60 Hz AC motor at 120 Hz.

4. The tuned vibration absorber of claim 3, wherein the excitation vibration generates a velocity error that is reduced by the tuned vibration absorber to a maximum of 0.25 percent of nominal.

5. The tuned vibration absorber of claim 1, wherein the motor is a 50 Hz AC motor.

6. The tuned vibration absorber of claim 5, wherein the angular velocity error is an excitation vibration produced by the 50 Hz AC motor at 100 Hz.

7. The tuned vibration absorber of claim 1, wherein the inertia ring, the hub and the plurality of spokes are made from molded plastic.

8. The tuned vibration absorber of claim 1, wherein the inertia ring, the hub and the plurality of spokes are made from a continuous length of steel.

9. The tuned vibration absorber of claim 7, wherein the I-beam shaped inertia ring has a first end attached to the plurality of spokes and a second end forming an outer surface of the tuned vibration absorber.

10. The tuned vibration absorber according to claim 1, wherein each spoke that couples the inertia ring and the hub has an effective stiffness (K) determined by the following equation:

$$K = (Ewt^3/3)(1/L + 3r_i/L^2 + 3r_i^2/L^3)$$

where,

E is a material elasticity of each spoke, $r_i$ is a radius of said hub, w is a width of each spoke, L is a length of each spoke and t is a thickness of each spoke.

11. The tuned vibration absorber according to claim 7, wherein said plurality of spokes comprises five spokes.

12. The tuned vibration absorber according to claim 8, wherein said plurality of spokes comprises three spokes.

13. A tuned vibration absorber for suppressing pulse noise in a motor comprising:

a hub connected to an armature shaft of the motor;

an inertia ring having a selected inertia ratio for generating an inertia to the armature shaft; and an elastomeric medium having a selected damping rate, said elastomeric medium being disposed between the hub and the inertia ring, said elastomeric medium providing a torsional resonance to the inertia ring, said elastomeric medium having a damping rate not greater than about three percent, the inertia ratio of said inertia ring and the damping rate of said elastomeric medium being selected to produce an anti-resonance frequency approximately equal to a forcing frequency of the armature shaft.

14. A tuned vibration absorber for attenuating an angular velocity error in a motor comprising:

a hub connected to an armature shaft of the motor;

a plurality of opposing tuned pendulums that generate an inertia to the armature shaft; and a plate, each of said plurality of opposing tuned pendulums being attached to a peripheral point on the plate directly opposite another peripheral point.

15. A method of attenuating an angular velocity error in an AC motor, comprising the steps of:

selecting an angular velocity error generated by the AC motor;

attaching a vibration absorber having an I-beam shaped inertia ring and a plurality of spokes to an armature shaft of the AC motor; and tuning the I-beam shaped inertia ring and the plurality of spokes to the selected angular velocity error and creating a combined resonant frequency approximately equal to a forcing frequency of the armature shaft to attenuate the angular velocity error in the motor.

16. The method of claim 15, wherein the angular velocity error selected is an excitation vibration that generates a velocity error at 120 Hz in a 60 Hz AC motor, the velocity error being reduced to a maximum of 0.25 percent of nominal by the tuned vibration absorber.

* * * * *